(12) United States Patent
Husband et al.

(10) Patent No.: US 11,258,324 B2
(45) Date of Patent: Feb. 22, 2022

(54) ELECTRIC DRIVE SYSTEMS

(71) Applicant: ROLLS-ROYCE plc, London (GB)

(72) Inventors: Stephen M. Husband, Derby (GB); Jeffrey Hobday, Derby (GB)

(73) Assignee: ROLLS-ROYCE plc, London (GB)

( * ) Notice: Subject to any disclaimer, the term of this patent is extended or adjusted under 35 U.S.C. 154(b) by 0 days.

(21) Appl. No.: 17/007,436

(22) Filed: Aug. 31, 2020

(65) Prior Publication Data
US 2021/0075285 A1    Mar. 11, 2021

(30) Foreign Application Priority Data

Sep. 11, 2019 (GB) .................................. 1913084.8

(51) Int. Cl.
*H02K 3/28* (2006.01)
*H02K 3/42* (2006.01)
(Continued)

(52) U.S. Cl.
CPC .................. *H02K 3/28* (2013.01); *H02K 3/42* (2013.01); *H02K 7/1823* (2013.01); *H02K 21/16* (2013.01);
(Continued)

(58) Field of Classification Search
CPC .............. H02K 3/24; H02K 3/28; H02K 3/42; H02K 7/1823; H02K 21/16; H02K 21/48;
(Continued)

(56) References Cited

U.S. PATENT DOCUMENTS 5,491,371 A  2/1996 Ooi
6,700,283 B2  3/2004 Kikuchi et al.
(Continued)

FOREIGN PATENT DOCUMENTS

CN    103051226 A    4/2013
CN    105811818 A    7/2016
(Continued)

OTHER PUBLICATIONS

Search Report of the Intellectual Property Office of the United Kingdom for GB1913080.6 dated Mar. 8, 2020.
(Continued)

*Primary Examiner* — Pedro J Cuevas
(74) *Attorney, Agent, or Firm* — Oliff PLC

(57) ABSTRACT

Fault-tolerant four-phase electric drive systems are provided. One such system comprises: a rotary electric machine having a permanent magnet rotor and an alternate-wound stator having eight evenly-spaced coils arranged in pairs, each coil in each pair being separated by 180 degrees; a first phase (ΦA) comprising a first one of the coil pairs and a first phase drive circuit connected therewith; a second phase (ΦB) separated by +45 degrees from the first phase and comprising a second one of the coil pairs and a second phase drive circuit connected therewith; a third phase (ΦC) separated by +90 degrees from the first phase and comprising a third one of the coil pairs and a third phase drive circuit connected therewith; a fourth phase (ΦD) separated by +135 degrees from the first phase and comprising a fourth one of the coil pairs and a fourth phase drive circuit connected therewith; and a controller connected with the first, second, third and fourth phase drive circuits to control operation thereof.

9 Claims, 12 Drawing Sheets

(51) Int. Cl.
 H02K 7/18 (2006.01)
 H02P 25/22 (2006.01)
 H02K 21/48 (2006.01)
 H02K 21/16 (2006.01)
 H02K 3/24 (2006.01)

(52) U.S. Cl.
 CPC ............. *H02K 21/48* (2013.01); *H02P 25/22* (2013.01); *F05D 2220/768* (2013.01); *H02K 3/24* (2013.01); *H02K 2213/03* (2013.01); *H02K 2213/06* (2013.01)

(58) Field of Classification Search
 CPC ............ H02K 2213/03; H02K 2213/06; H02P 25/22; F05D 2220/768
 USPC .................................. 290/40 A, 52; 60/786
 See application file for complete search history.

(56) References Cited

U.S. PATENT DOCUMENTS

| | | | |
|---|---|---|---|
| 8,803,384 B2* | 8/2014 | Hull | H02K 3/28 |
| | | | 310/68 R |
| 2002/0074889 A1 | 6/2002 | Kikuchi et al. | |
| 2003/0057797 A1 | 3/2003 | Kaneko et al. | |
| 2003/0146730 A1 | 8/2003 | Chen | |
| 2004/0085040 A1 | 5/2004 | Chen | |
| 2007/0102935 A1* | 5/2007 | Sarlioglu | F01D 15/10 |
| | | | 290/52 |
| 2012/0104884 A1 | 5/2012 | Wagner et al. | |
| 2012/0286523 A1* | 11/2012 | Hull | H02K 3/28 |
| | | | 290/40 A |
| 2015/0288255 A1 | 10/2015 | Barker et al. | |
| 2016/0109133 A1* | 4/2016 | Edwards | F02C 9/26 |
| | | | 60/786 |
| 2018/0054105 A1 | 2/2018 | Grübel et al. | |
| 2019/0229573 A1 | 7/2019 | Zhao et al. | |
| 2020/0025066 A1* | 1/2020 | Husband | F02C 9/18 |
| 2020/0052552 A1* | 2/2020 | Husband | F02C 9/42 |
| 2021/0070463 A1* | 3/2021 | Husband | F02C 7/36 |
| 2021/0071573 A1* | 3/2021 | Brookes | F02C 3/113 |
| 2021/0071583 A1* | 3/2021 | Bruce | F02C 7/32 |
| 2021/0170890 A1* | 6/2021 | Iyer | H02P 27/08 |

FOREIGN PATENT DOCUMENTS

| | | |
|---|---|---|
| CN | 107959362 A | 4/2018 |
| DE | 102015207368 A1 | 10/2016 |
| DE | 102016204688 A1 | 9/2017 |
| EP | 1215801 A2 | 6/2002 |
| EP | 1416609 A2 | 5/2004 |
| EP | 1990506 A2 | 11/2008 |
| GB | 1530897 A | 11/1978 |
| JP | H09205743 A | 8/1997 |
| JP | 2010166708 A | 7/2010 |
| WO | 2014/057245 A2 | 4/2014 |

OTHER PUBLICATIONS

Search Report of the Intellectual Property Office of the United Kingdom for GB1913081.4 dated Mar. 7, 2020.
Search Report of the Intellectual Property Office of the United Kingdom for GB1913083.0 dated Mar. 7, 2020.
Search Report of the Intellectual Property Office of the United Kingdom for GB1913084.8 dated Mar. 10, 2020.
Feb. 1, 2021 Extended Search Report issued in European Patent Application No. 20192314.1.

* cited by examiner

SECTION I-I

SECTION II-II

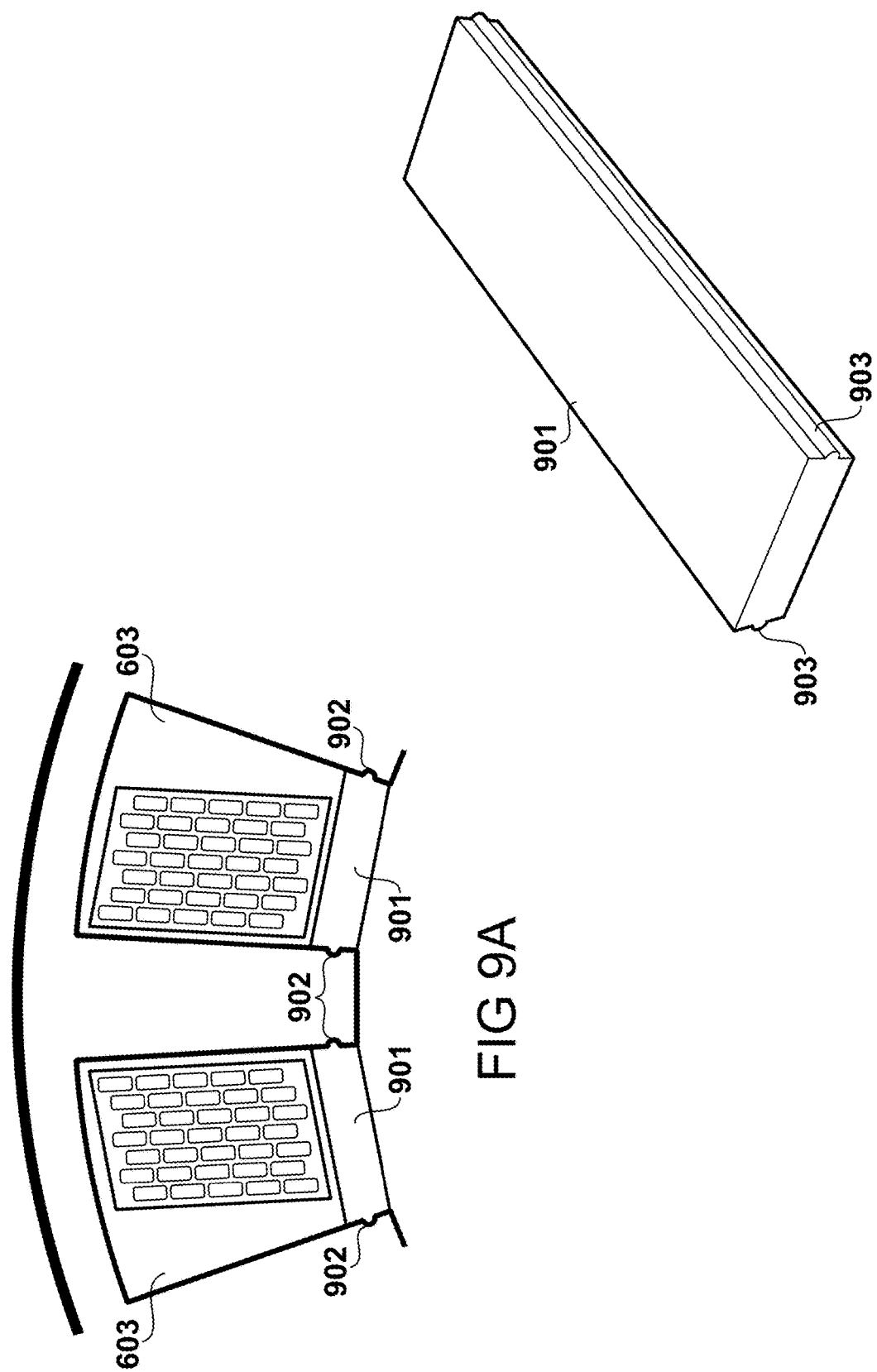

ELECTRIC DRIVE SYSTEMS

CROSS-REFERENCE TO RELATED APPLICATIONS

This specification is based upon and claims the benefit of priority from UK Patent Application Number 1913084.8 filed on 11 Sep. 2019, the entire contents of which are incorporated herein by reference.

TECHNICAL FIELD

This disclosure concerns fault-tolerant electric drive systems.

BACKGROUND

In aerospace, the more electric engine (MEE) and more electric aircraft (MEA) concepts have been advocated for the substantial reduction in fuel consumption and complexity they bring. Service experience has shown however that the means of electrical generation in such configurations can and do fail from time to time. In addition, the electrical aspects of the devices are considered complex systems and so a rate approach to certification is not possible. This imposes a requirement for fault-tolerant designs. It is accepted practice to provide single fault-tolerance, on the basis that the mean time before failure for the surviving system is sufficiently long.

In one known approach, two individual starter-generator devices are installed per engine, each one of which is connected at a respective pad on the accessory gearbox. In the event that one device fails, the other may take over the full duty. This approach however has, during fault-free operation, an attendant 100 percent over-rating in terms of power, weight, and installation volume simply to meet the requirement of single fault-tolerance.

Other approaches that have been proposed involve packaging two starter-generators with a common housing such that they share a common shaft, and utilise only one pad on an accessory gearbox. This may be achieved as the common mechanical parts may be engineered to have a sufficiently low failure rate that the likelihood of failure is extremely remote, with duplexing of the electrical components providing the single fault-tolerance. Whilst this reduces the installation complexity and to a degree reduces weight, there is still a 100 percent overrating in terms of electrical generation capacity.

Whilst at a smaller scale, namely for an aircraft fuel pump, the present applicant has developed independent four-phase drive systems. The use of independent phase drives permits a single phase to develop a fault, with the remaining three phases providing continued operation. In such configurations the degree of overrating of capacity may be limited to 33 percent, thus resulting in a substantial weight saving in the electric machine, albeit at the expense of a more complex drive system.

It is an object of the invention to apply such a four-phase approach in a future MEA-compatible system.

It is an object of the invention to apply such a four-phase approach to a motor-generator suitable for starting a gas turbine engine and providing power to an aircraft.

It is an object of the invention to provide a cooling scheme for such a motor-generator.

It is an object of the invention to reduce the complexity of assembly of such a machine.

SUMMARY

The invention is directed to fault-tolerant four-phase electric drive systems. One such system comprises:
a rotary electric machine having a permanent magnet rotor and an alternate-wound stator having eight evenly-spaced coils arranged in pairs, each coil in each pair being separated by 180 degrees;
a first phase ($\Phi A$) comprising a first one of the coil pairs and a first phase drive circuit connected therewith;
a second phase ($\Phi B$) separated by +45 degrees from the first phase and comprising a second one of the coil pairs and a second phase drive circuit connected therewith;
a third phase ($\Phi C$) separated by +90 degrees from the first phase and comprising a third one of the coil pairs and a third phase drive circuit connected therewith;
a fourth phase ($\Phi D$) separated by +135 degrees from the first phase and comprising a fourth one of the coil pairs and a fourth phase drive circuit connected therewith;
a controller connected with the first, second, third and fourth phase drive circuits to control operation thereof.

In an embodiment, in a motor mode of operation:
in response to loss of operation of one of the first phase and the third phase, the phase drive controller is configured to cease operation of both the first phase and the third phase;
in response to loss of operation of one of the second phase and the fourth phase, the phase drive controller is configured to cease operation of both the second phase and the fourth phase.

In an embodiment, the first phase drive circuit and third phase drive circuit are connected with a first dc bus and the second phase drive circuit and the fourth phase drive circuit are connected with a second dc bus.

In an embodiment, the first phase drive circuit, second phase drive circuit, third phase drive circuit, and fourth phase drive circuit are connected with a first dc bus via respective electrical contactors operable by the controller and the first phase drive circuit, second phase drive circuit, third phase drive circuit, and fourth phase drive circuit are connected with a second dc bus via respective electrical contactors operable by the controller.

In an embodiment, in a non-faulted mode of operation, the controller is configured to:
close contactors between the first phase drive circuit and the first dc bus, the second phase drive circuit and the second dc bus, the third phase drive circuit and the first dc bus, and the fourth phase drive circuit and the second dc bus;
open contactors between the first phase drive circuit and the second dc bus, the second phase drive circuit and the dc bus, the third phase drive circuit and the second dc bus, and the fourth phase drive circuit and the first dc bus.

In an embodiment, in response to a fault on the first dc bus, the controller is configured to:
close contactors between the second dc bus and the first phase drive circuit, second phase drive circuit, third phase drive circuit, and fourth phase drive circuit;
open contactors between the first dc bus and the first phase drive circuit, second phase drive circuit, third phase drive circuit, and fourth phase drive circuit.

In an embodiment, in response to a fault on the second dc bus, the controller is configured to:
close contactors between the first dc bus and the first phase drive circuit, second phase drive circuit, third phase drive circuit, and fourth phase drive circuit;
open contactors between the second dc bus and the first phase drive circuit, second phase drive circuit, third phase drive circuit, and fourth phase drive circuit.

In an embodiment, the stator has sixteen slots, each of which is defined by a wound tooth carrying a coil, and an unwound tooth not carrying a coil, and wherein the width of wound teeth is greater than the width of unwound teeth.

In an embodiment, the width of wound teeth is twice the width of unwound teeth.

In an embodiment, the slots are substantially trapezoidal in cross section.

BRIEF DESCRIPTION OF THE DRAWINGS

Embodiments will now be described by way of example only with reference to the accompanying drawings, which are purely schematic and not to scale, and in which:

FIG. 9A is another magnified view of the stator of the motor-generator;

FIG. 9B is an isometric view of the sealing elements in the stator of the motor-generator;

DETAILED DESCRIPTION

FIG. 1

Figure 1:
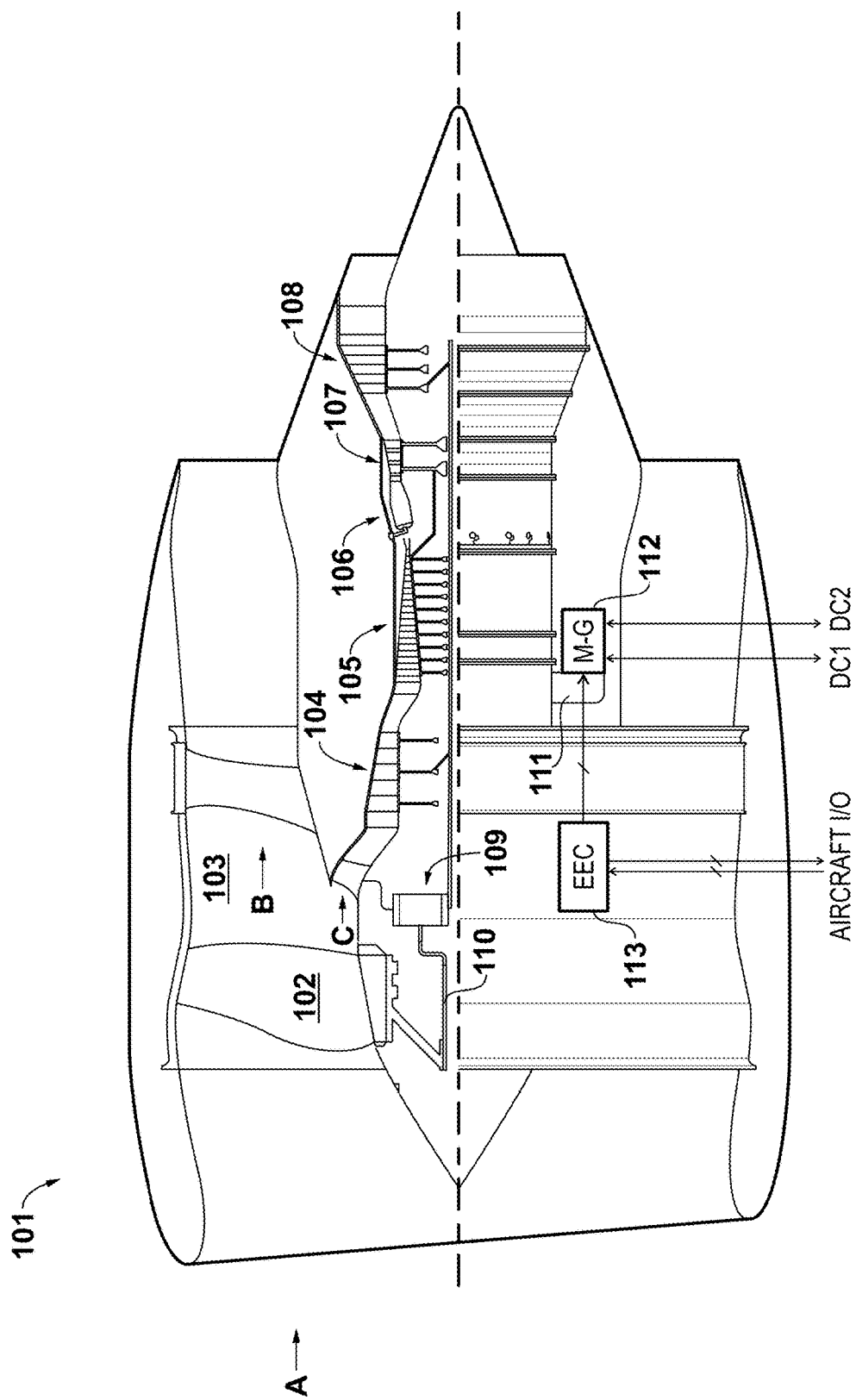
FIG. 1 shows a general arrangement of a turbofan engine for an aircraft, including a motor-generator and two dc busses for the aircraft.

A general arrangement of an engine 101 for an aircraft is shown in FIG. 1. In the present embodiment, the engine 101 is of turbofan configuration, and thus comprises a ducted fan 102 that receives intake air A and generates two pressurised airflows: a bypass flow B which passes axially through a bypass duct 103 and a core flow C which enters a core gas turbine.

The core gas turbine comprises, in axial flow series, a low-pressure compressor 104, a high-pressure compressor 105, a combustor 106, a high-pressure turbine 107, and a low-pressure turbine 108.

In use, the core flow C is compressed by the low-pressure compressor 104 and is then directed into the high-pressure compressor 105 where further compression takes place. The compressed air exhausted from the high-pressure compressor 105 is directed into the combustor 106 where it is mixed with fuel and the mixture is combusted. The resultant hot combustion products then expand through, and thereby drive, the high-pressure turbine 107 and in turn the low-pressure turbine 108 before being exhausted to provide a small proportion of the overall thrust.

The high-pressure turbine 107 drives the high-pressure compressor 105 via an interconnecting shaft. The low-pressure turbine 108 drives the low-pressure compressor 104 via another interconnecting shaft. Together, the high-pressure compressor 105, high-pressure turbine 107, and associated interconnecting shaft form part of a high-pressure spool of the engine 101. Similarly, the low-pressure compressor 104, low-pressure turbine 108, and associated interconnecting shaft form part of a low-pressure spool of the engine 101. Such nomenclature will be familiar to those skilled in the art.

The fan 102 is driven by the low-pressure turbine 108 via a reduction gearbox in the form of a planetary-configuration epicyclic gearbox 109. Thus in this configuration, the low-pressure turbine 108 is connected with a sun gear of the gearbox 109. The sun gear is meshed with a plurality of planet gears located in a rotating carrier, which planet gears are in turn are meshed with a static ring gear. The rotating carrier drives the fan 102 via a fan shaft 110.

It will be appreciated that in alternative embodiments a star-configuration epicyclic gearbox (in which the planet carrier is static and the ring gear rotates and provides the output) may be used instead.

As described previously, it is desirable to implement a greater degree of electrical functionality on the airframe and on the engine. To this end, the engine 101 comprises a high-pressure spool driven, core-mounted accessory gearbox 111 of conventional drive configuration, and which has a motor-generator 112 mounted thereto. As well as operation as a generator to supply an aircraft on which the engine 101 is installed with electrical power, the motor-generator 112 may drive the high-pressure spool to facilitate starting of the engine 101 in place of an air turbine starter.

It will of course be appreciated by those skilled in the art that any suitable location for the motor-generator 112 may be adopted. For example, the motor-generator 112 may be mounted on the engine centreline axially forward of the high-pressure compressor 105, directly connected with the high-pressure spool.

In the present example, the motor-generator 112 operates in response to command signals received from an engine electronic controller (EEC) 113, which in turn responds to demand signals received from the aircraft on which the engine is installed. In the present embodiment the EEC 113 is a full-authority digital engine controller (FADEC), the configuration of which will be known and understood by those skilled in the art.

In an implementation contemplated herein, the motor-generator 112 is configured such that it may output to or receive electrical power from two dc busses—a configuration contemplated for future more electric aircraft platforms. The configuration of this electric drive system will be described with reference to FIG. 2. It will be appreciated by those skilled in the art however that in alternative implementations electrical power may be provided to the motor-generator 112 by way of an alternating current supply, for example from an external supply during a starting procedure for the engine 101.

The fault-tolerant radial flux configuration of the motor-generator 112 will be described with reference to FIGS. 3 to 6.

The cooling system for the motor-generator 112 will be described with reference to FIGS. 7 through 9B.

Control strategies to respond to different faults in the motor-generator 112 or the broader electric drive system will be described with reference to FIGS. 10 to 12.

Various embodiments of the engine 101 may include one or more of the following features.

It will be appreciated that instead of being a turbofan having a ducted fan arrangement, the engine 101 may instead be a turboprop comprising a propeller for producing thrust.

The low- and high-pressure compressors 104 and 105 may comprise any number of stages, for example multiple stages. Each stage may comprise a row of rotor blades and a row of stator vanes, which may be variable stator vanes (in that their angle of incidence may be variable). In addition to, or in place of, axial stages, the low-or high-pressure compressors 104 and 105 may comprise centrifugal compression stages.

The low- and high-pressure turbines 107 and 108 may also comprise any number of stages.

The fan 102 may have any desired number of fan blades, for example 16, 18, 20, or 22 fan blades.

Each fan blade may be defined as having a radial span extending from a root (or hub) at a radially inner gas-washed location, or 0 percent span position, to a tip at a 100 percent span position. The ratio of the radius of the fan blade at the hub to the radius of the fan blade at the tip—the hub-tip ratio—may be less than (or on the order of) any of: 0.4, 0.39, 0.38 0.37, 0.36, 0.35, 0.34, 0.33, 0.32, 0.31, 0.3, 0.29, 0.28, 0.27, 0.26, or 0.25. The hub-tip ratio may be in an inclusive range bounded by any two of the aforesaid values (i.e. the values may form upper or lower bounds). The hub-tip ratio may both be measured at the leading edge (or axially forwardmost) part of the blade. The hub-tip ratio refers, of course, to the gas-washed portion of the fan blade, i.e. the portion radially outside any platform.

The radius of the fan 102 may be measured between the engine centreline and the tip of a fan blade at its leading edge. The fan diameter may be greater than (or on the order of) any of: 2.5 metres, 2.6 metres, 2.7 metres, 2.8 metres, 2.9 metres, 3 metres, 3.1 metres, 3.2 metres, 3.3 metres, 3.4 metres, 3.5 metres, 3.6 metres, 3.7 metres, 3.8 metres, or 3.9 metres. The fan diameter may be in an inclusive range bounded by any two of the aforesaid values (i.e. the values may form upper or lower bounds).

The rotational speed of the fan 102 may vary in use. Generally, the rotational speed is lower for fans with a higher diameter. Purely by way of non-limitative example, the rotational speed of the fan at cruise conditions may be less than 2500 rpm, for example less than 2300 rpm. Purely by way of further non-limitative example, the rotational speed of the fan 102 at cruise conditions for an engine having a fan diameter in the range of from 2.5 metres to 3 metres (for example 2.5 metres to 2.8 metres) may be in the range of from 1700 rpm to 2500 rpm, for example in the range of from 1800 rpm to 2300 rpm, or, for example in the range of from 1900 rpm to 2100 rpm. Purely by way of further non-limitative example, the rotational speed of the fan at cruise conditions for an engine having a fan diameter in the range of from 3.2 metres to 3.8 metres may be in the range of from 1200 rpm to 2000 rpm, for example in the range of from 1300 rpm to 1800 rpm, for example in the range of from 1400 rpm to 1600 rpm.

In use of the engine 101, the fan 102 (with its associated fan blades) rotates about a rotational axis. This rotation results in the tip of the fan blade moving with a velocity $U_{tip}$. The work done by the fan blades on the flow results in an enthalpy rise dH of the flow. A fan tip loading may be defined as $dH/U_{tip}^2$, where dH is the enthalpy rise (for example the one dimensional average enthalpy rise) across the fan and $U_{tip}$ is the (translational) velocity of the fan tip, for example at the leading edge of the tip (which may be defined as fan tip radius at leading edge multiplied by angular speed). The fan tip loading at cruise conditions may be greater than (or on the order of) any of: 0.3, 0.31, 0.32, 0.33, 0.34, 0.35, 0.36, 0.37, 0.38, 0.39 or 0.4. The fan tip loading may be in an inclusive range bounded by any two of the values in the previous sentence (i.e. the values may form upper or lower bounds).

The engine 101 may have any desired bypass ratio, where the bypass ratio is defined as the ratio of the mass flow rate of the flow B through the bypass duct to the mass flow rate of the flow C through the core at cruise conditions. Depending upon the selected configuration, the bypass ratio may be greater than (or on the order of) any of the following: 10, 10.5, 11, 11.5, 12, 12.5, 13, 13.5, 14, 14.5, 15, 15.5, 16, 16.5, or 17. The bypass ratio may be in an inclusive range bounded by any two of the aforesaid values (i.e. the values may form upper or lower bounds). The bypass duct may be substantially annular. The bypass duct may be radially outside the core engine. The radially outer surface of the bypass duct may be defined by a nacelle and/or a fan case.

The overall pressure ratio of the engine 101 may be defined as the ratio of the stagnation pressure upstream of the fan 102 to the stagnation pressure at the exit of the high-pressure compressor 105 (before entry into the combustor). By way of non-limitative example, the overall pressure ratio of the engine 101 at cruise may be greater than (or on the order of) any of the following: 35, 40, 45, 50, 55, 60, 65, 70, 75. The overall pressure ratio may be in an inclusive range bounded by any two of the aforesaid values (i.e. the values may form upper or lower bounds).

Specific thrust of the engine 101 may be defined as the net thrust of the engine divided by the total mass flow through the engine 101. At cruise conditions, the specific thrust of the engine 101 may be less than (or on the order of) any of the following: 110 $Nkg^{31}$ $^1s$, 105 $Nkg^{-1}s$, 100 $Nkg^{-1}s$, 95 $Nkg^{-1}s$, 90 $Nkg^{-1}s$, 85 $Nkg^{-1}s$, or 80 $Nkg^{-1}s$. The specific thrust may be in an inclusive range bounded by any two of the values in the previous sentence (i.e. the values may form upper or lower bounds). Such engines may be particularly efficient in comparison with conventional gas turbine engines.

The engine 101 may have any desired maximum thrust. For example, the engine 101 may be capable of producing a maximum thrust of at least (or on the order of) any of the following: 160 kilonewtons, 170 kilonewtons, 180 kilonewtons, 190 kilonewtons, 200 kilonewtons, 250 kilonewtons, 300 kilonewtons, 350 kilonewtons, 400 kilonewtons, 450 kilonewtons, 500 kilonewtons, or 550 kilonewtons. The maximum thrust may be in an inclusive range bounded by any two of the aforesaid values (i.e. the values may form upper or lower bounds). The thrust referred to above may be the maximum net thrust at standard atmospheric conditions at sea level plus 15 degrees Celsius (ambient pressure 101.3 kilopascals, temperature 30 degrees Celsius), with the engine 101 being static.

In use, the temperature of the flow at the entry to the high-pressure turbine 107 may be particularly high. This temperature, which may be referred to as turbine entry temperature or TET, may be measured at the exit to the combustor 106, for example immediately upstream of the first turbine vane, which itself may be referred to as a nozzle guide vane. At cruise, the TET may be at least (or on the order of) any of the following: 1400 kelvin, 1450 kelvin, 1500 kelvin, 1550 kelvin, 1600 kelvin or 1650 kelvin. The TET at cruise may be in an inclusive range bounded by any two of the aforesaid values (i.e. the values may form upper or lower bounds). The maximum TET in use of the engine 101 may be, for example, at least (or on the order of) any of the following: 1700 kelvin, 1750 kelvin, 1800 kelvin, 1850 kelvin, 1900 kelvin, 1950 kelvin or 2000 kelvin. The maximum TET may be in an inclusive range bounded by any two of the aforesaid values (i.e. the values may form upper or lower bounds). The maximum TET may occur, for example, at a high thrust condition, for example at a maximum take-off (MTO) condition.

A fan blade and/or aerofoil portion of a fan blade described and/or claimed herein may be manufactured from any suitable material or combination of materials. For example at least a part of the fan blade and/or aerofoil may be manufactured at least in part from a composite, for example a metal matrix composite and/or an organic matrix composite, such as carbon fibre. By way of further example at least a part of the fan blade and/or aerofoil may be manufactured at least in part from a metal, such as a titanium based metal or an aluminium based material (such as an aluminium-lithium alloy) or a steel based material. The fan blade may comprise at least two regions manufactured using different materials. For example, the fan blade may have a protective leading edge, which may be manufactured using a material that is better able to resist impact (for example from birds, ice or other material) than the rest of the blade. Such a leading edge may, for example, be manufactured using titanium or a titanium-based alloy. Thus, purely by way of example, the fan blade may have a carbon-fibre or aluminium-based body with a titanium leading edge.

The fan 102 may comprise a central hub portion, from which the fan blades may extend, for example in a radial direction. The fan blades may be attached to the central portion in any desired manner. For example, each fan blade may comprise a fixture which may engage a corresponding slot in the hub. Purely by way of example, such a fixture may be in the form of a dovetail that may slot into and/or engage a corresponding slot in the hub/disc in order to fix the fan blade to the hub. By way of further example, the fan blades may be formed integrally with a central hub portion. Such an arrangement may be a bladed disc or a bladed ring. Any suitable method may be used to manufacture such a bladed disc or bladed ring. For example, at least a part of the fan blades may be machined from a billet and/or at least part of the fan blades may be attached to the hub/disc by welding, such as linear friction welding.

The engine 101 may be provided with a variable area nozzle (VAN). Such a variable area nozzle may allow the exit area of the bypass duct to be varied in use. The general principles of the present disclosure may apply to engines with or without a VAN.

As used herein, cruise conditions have the conventional meaning and would be readily understood by the skilled person. Thus, for a given gas turbine engine for an aircraft, the skilled person would immediately recognise cruise conditions to mean the operating point of the engine at mid-cruise of a given mission (which may be referred to in the art as the "economic mission") may mean cruise conditions of an aircraft to which the gas turbine engine is designed to be attached. In this regard, mid-cruise is the point in an aircraft flight cycle at which 50 percent of the total fuel that is burned between top of climb and start of descent has been burned (which may be approximated by the midpoint—Such cruise conditions may be conventionally defined as the conditions at mid-cruise, for example the conditions experienced by the aircraft and/or engine at the midpoint (in terms of time and/or distance—) between top of climb and start of descent. Cruise conditions thus define an operating point of, the gas turbine engine that provides a thrust that would ensure steady state operation (i.e. maintaining a constant altitude and constant Mach number) at mid-cruise of an aircraft to which it is designed to be attached, taking into account the number of engines provided to that aircraft. For example where an engine is designed to be attached to an aircraft that has two engines of the same type, at cruise conditions the engine provides half of the total thrust that would be required for steady state operation of that aircraft at mid-cruise.

In other words, for a given gas turbine engine for an aircraft, cruise conditions are defined as the operating point of the engine that provides a specified thrust (required to provide—in combination with any other engines on the aircraft—steady state operation of the aircraft to which it is designed to be attached at a given mid-cruise Mach Number) at the mid-cruise atmospheric conditions (defined by the International Standard Atmosphere according to ISO 2533 at the mid-cruise altitude). For any given gas turbine engine for an aircraft, the mid-cruise thrust, atmospheric conditions and Mach number are known, and thus the operating point of the engine at cruise conditions is clearly defined.

The cruise conditions may correspond to ISA standard atmospheric conditions at an altitude that is in the range of from 10000 to 15000 metres, such as from 10000 to 12000 metres, or from 10400 to 11600 metres (around 38000 feet), or from 10500 to 11500 metres, or from 10600 to 11400 metres, or from 10700 metres (around 35000 feet) to 11300 metres, or from 10800 to 11200 metres, or from 10900 to 11100 metres, or 11000 metres. The cruise conditions may correspond to standard atmospheric conditions at any given altitude in these ranges.

The forward speed at the cruise condition may be any point in the range of from Mach 0.7 to 0.9, for example one of Mach 0.75 to 0.85, Mach 0.76 to 0.84, Mach 0.77 to 0.83, Mach 0.78 to 0.82, Mach 0.79 to 0.81, Mach 0.8, Mach 0.85, or in the range of from Mach 0.8 to 0.85. Any single speed within these ranges may be the cruise condition. For some aircraft, the cruise conditions may be outside these ranges, for example below Mach 0.7 or above Mach 0.9.

Thus, for example, the cruise conditions may correspond specifically to a pressure of 23 kilopascals, a temperature of minus 55 degrees Celsius, and a forward Mach number of 0.8.

It will of course be appreciated, however, that the principles of the invention claimed herein may still be applied to engines having suitable design features falling outside of the aforesaid parameter ranges.

FIG. 2

Figure 2:
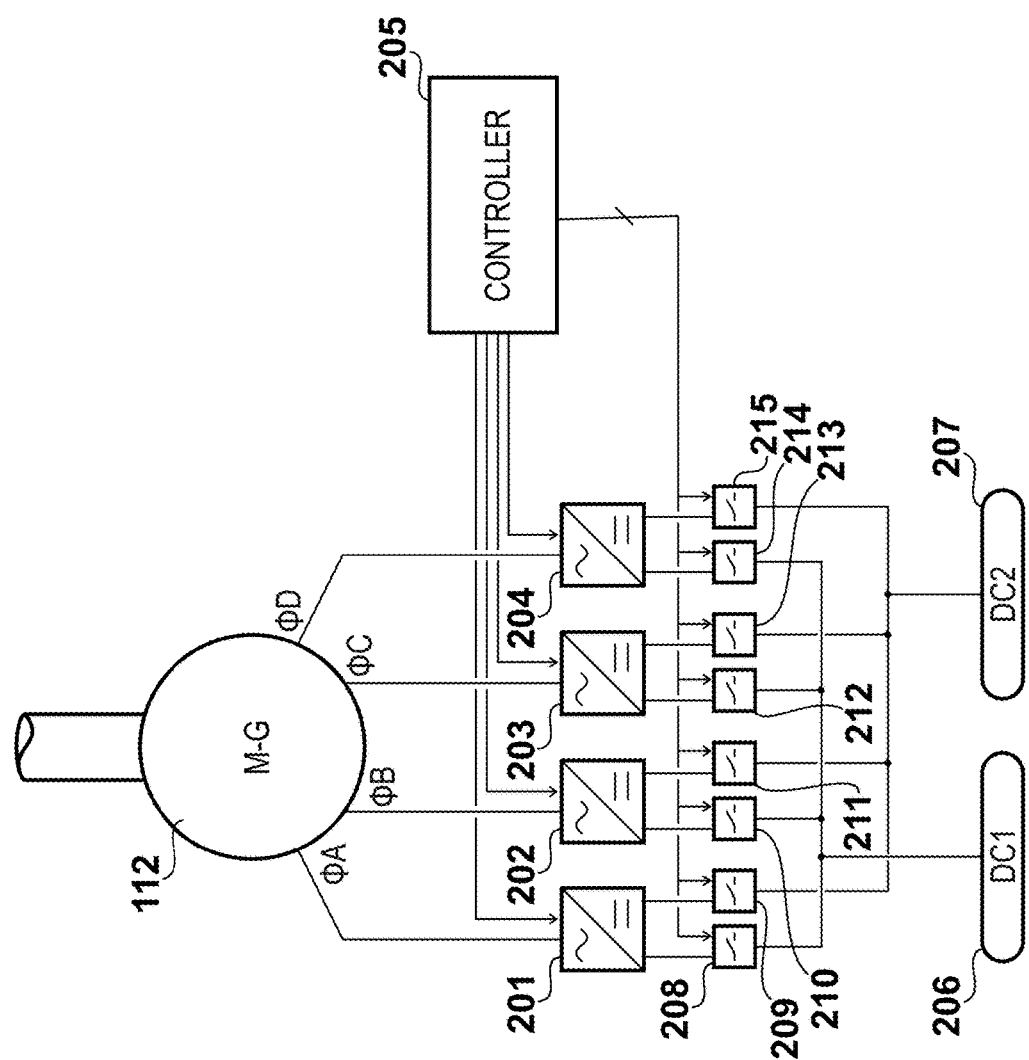
FIG. 2 shows an electric drive system for the motor-generator of FIG. 1.

As described previously, in an aspect the motor-generator 112 is configured such that it may output to or receive electrical power from two dc busses in a more electric aircraft installation. Such a system, hereinafter referred to as an electric drive system, is shown in FIG. 2 in the form of a logical single-line diagram.

The motor-generator 112 comprises four phase connections, $\Phi A$, $\Phi B$, $\Phi C$, and $\Phi D$, which are each connected with an ac side of a respective independent phase drive circuit 201, 202, 203, and 204. As will be described with reference to FIG. 3, in the present embodiment the internal topology of the motor-generator 112 is of duplex four phase configuration, and thus in practice an additional set of connections may be provided to provide parallel connection. Alternatively connection may be made in series either internally to the motor-generator 112 or externally.

Referring again to FIG. 2, in the present embodiment the phase drive circuits 201 to 204 are bidirectional converter circuits. In a specific embodiment, the phase drive circuits 201 to 204 are H-bridges accompanied by appropriate filters, although it will be appreciated that any other suitable bidirectional converter topology may be used, such as a neutral point clamped converter topology or a pseudo-resonant soft-switching full bridge topology.

The phase drive circuits 201 to 204 operate under control of a controller 205, which co-ordinates the operation of the phase drive circuits 201 to 204 to effect rectification or inversion as appropriate.

In the present embodiment, the controller 205 in turn operates under control of the EEC 113 in either a motor or generator mode in the known manner.

The dc sides of the phase drive circuits 201 to 204 are connected to both a first dc bus 206 and a second dc bus 207. A set of eight electrical contactors 208 to 215 between the dc side of the phase drive circuits 201 to 204, and the first dc bus 206 and the second dc bus 207, providing reconfigurable connection and isolation therebetween. In the present configuration, the contactors 208 to 215 operate under the control of controller 205. In a non-faulted mode of operation, phases ΦA and ΦC of the motor-generator 112 are connected to the first dc bus 206, and phases ΦB and ΦD of the motor-generator 112 are connected to the second dc bus 207. This may be achieved by controller 205 setting contactors 208, 211, 212, and 215 to a closed condition, and setting contactors 209, 210, 213, and 214 to an open condition.

As will be described with reference to FIGS. 3 and 4, this configuration of the system permits each phase ΦA, ΦB, ΦC, and ΦD to remain isolated during fault-free operation.

Operation of the controller 205 in response to fault conditions will be described further with reference to FIGS. 10 to 12.

It will of course be appreciated that other configurations may be employed with reduced contactor count, for example utilising fuses to isolated faulted elements.
FIG. 3

Figure 3:
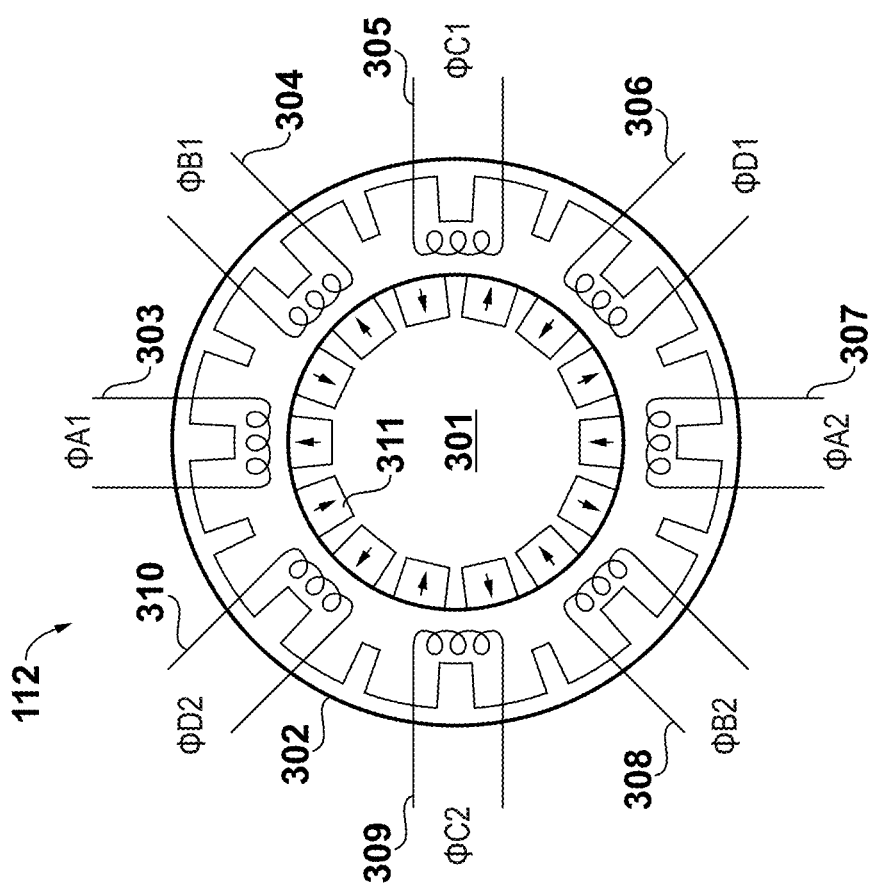
FIG. 3 is schematic of the winding scheme of the motor-generator of FIG. 1.

The winding configuration of the motor-generator 112 is shown in schematic form in FIG. 3.

The motor-generator 112 comprises a rotor 301 located interior to a stator 302. The rotor 301 is of permanent magnet configuration, and in this example has 14 poles, i.e. the pole pair number p=7.

The stator 302 is configured as an alternate-wound stator, and in this example has sixteen teeth defining sixteen slots, i.e. the slot number Ns=16. Eight evenly-spaced coils 303 to 310 are located on alternate teeth such that there is one coil side per slot—this arrangement may also be referred to as a modular winding. This provides physical, thermal, electrical, and magnetic isolation between the coils which provides fault tolerance. In a specific embodiment, the coils 303 to 310 are configured as precision coils, i.e. coils formed identically such that each turn occupies a specific, predefined location on the coil.

In an embodiment, short circuits are accommodated by configuring each coil to have a per-unit inductance of about unity. In an embodiment, the per-unit inductance is from 1.1 to 1.4, which may be accommodated by providing appropriate insulation and cooling capacity, without imposing as high losses during normal operation as with a strict one-per-unit inductance design. In a specific embodiment, the per-unit inductance is 1.25. In this way, the short circuit current is limited to 1.25 normal operational values.

In an embodiment a non-overlapping winding approach is adopted which results in smaller end-windings which improves efficiency.

In the present example, the selection of values for p and Ns result in a fractional ratio of slot number and pole number (8/7), which results in low cogging torque. Further, given the number of poles 2p and number of slots Ns differ by only 2, the slot-pitch is nearly the same as the pole-pitch which improves flux-linkage.

Forming part of the electric drive system of FIG. 2, the motor-generator 112 is configured as a four-phase machine. As noted previously, the stator 302 comprises eight coils 303 to 310. In the present embodiment, the motor-generator is configured as a duplex four-phase machine, in which coil pairs separated by 180 degrees form part of the same phase. The individual coils in the present example are connected in parallel with the respective phase drive circuit, although it is envisaged that they may also be connected in series. The choice may be made upon, for example, the ability to run cables and/or the installation space envelope for terminations, etc.

Thus, in the present example, coils 303 and 307 form a coil pair separated by 180 degrees. Both coils form part of phase ΦA, with coil 302 being labelled ΦA1, and coil 307 being labelled ΦA2. Similar angular separation, nomenclature and labelling applies to the other coils. Thus, it may be seen that phase ΦB is separated by +45 degrees from ΦA, phase ΦB is separated by +90 degrees from ΦA, and phase ΦD is separated by +135 degrees from ΦA.

The approach adopted herein of pairing coils together means that the machine is mechanically balanced, in particular during a fault condition when one or more phases may be disabled.

In the present embodiment, the rotor 301 comprises 14 permanent magnets 311. In a specific embodiment, the magnets 311 are arranged in a Halbach array. Halbach array rotors produce a larger overall flux and therefore power capability for a given amount of magnetic material, and also tend to produce a near-sinusoidal air-gap flux distribution which leads to smooth operation. In the present embodiment, the magnets 311 are samarium cobalt magnets, which material is selected due to its relatively high temperature capability. It is envisaged that if sufficient cooling capacity can be guaranteed, then neodymium magnets may be used instead. It will be appreciated that other known suitable permanent magnet materials may be substituted.
FIGS. 4 & 5

Figure 4:
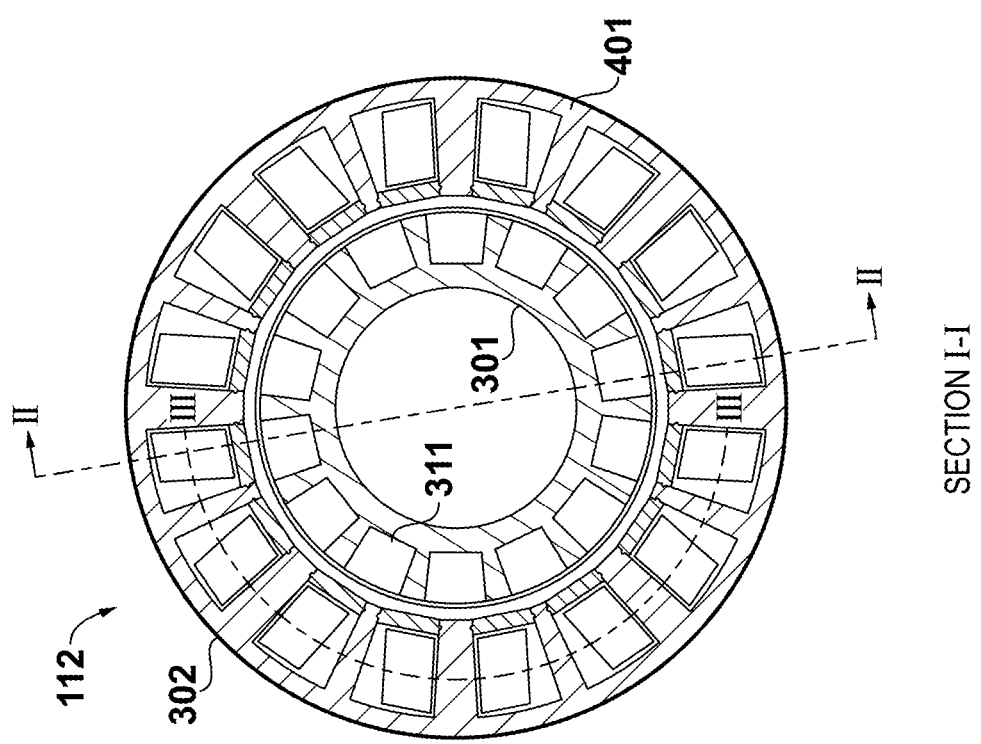
FIG. 4 is a radial cross-section of the motor-generator on I-I of FIG. 5.
Figure 5:
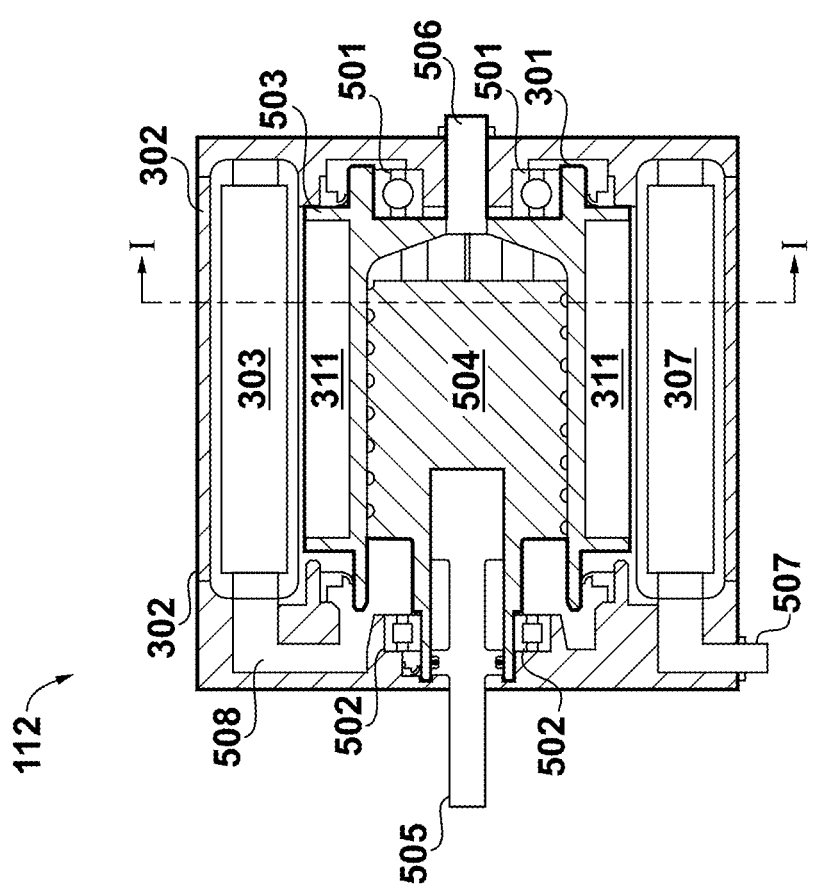
FIG. 5 is an axial cross-section of the motor-generator on II-II of FIG. 4.
Figure 6:
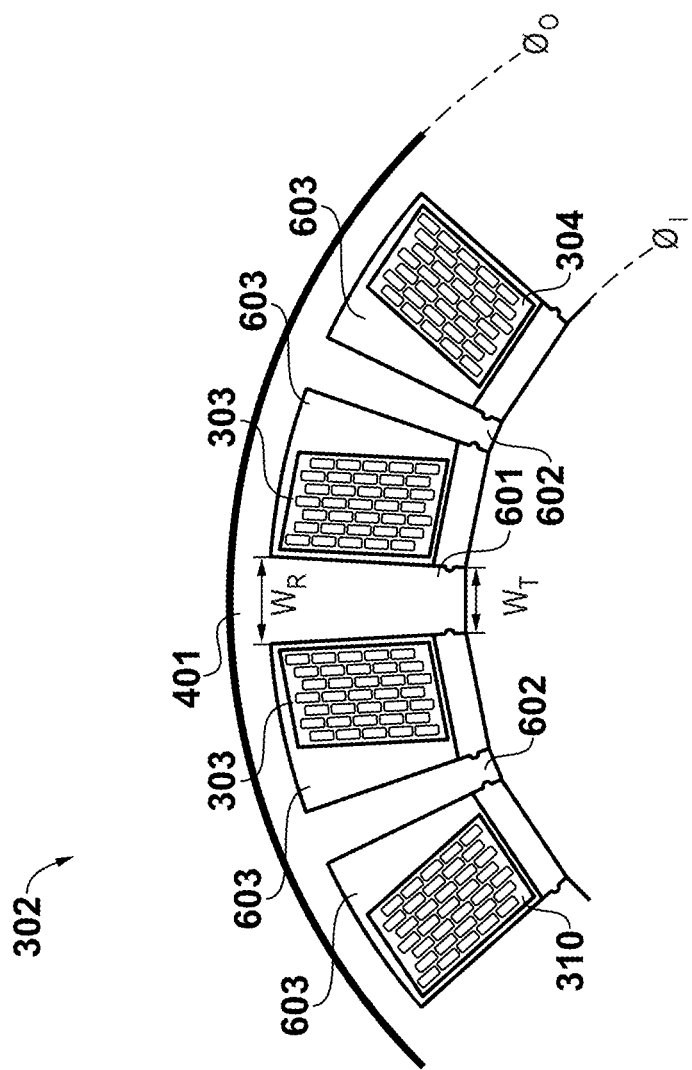
FIG. 6 is a magnified view of the stator of the motor-generator.

Radial and axial cross sections of an embodiment of the motor-generator 112 are shown in FIG. 4 (section I-I) and FIG. 5 (section II-II) respectively.

The stator 302 comprises a yoke 401 on which the coils 303 to 310 are mounted. In the present embodiment, each slot in the stator 302 is defined by a wound tooth carrying a coil, and an unwound tooth not carrying a coil.

In the present embodiment, the yoke 401 is formed of a lamination stack of the known type. In a specific embodiment, the laminations are iron cobalt laminations, although silicon iron or any other suitable lamination material may be used as an alternative. In the present embodiment, the laminations are 0.2 millimetres in thickness, although it will be appreciated that other suitable thicknesses may be chosen to balance losses and manufacturing complexities, etc.

The rotor 301 comprises a hollow outer magnet carrier 503 in which the permanent magnets 311 are retained by banding such as carbon fibre or similar. In the present embodiment, the ratio of the radius of the rotor 301 to the radial depth of the permanent magnets 311 is from 0.2 to 0.3. In a specific embodiment this ratio is 0.25. This provides the requisite power rating despite the high inductance configuration for fault tolerance. Furthermore, selection of ratios within the aforesaid range reduces the possibility of demagnetisation due to high temperature operation, such as during a short circuit fault condition.

In a specific embodiment, the hollow outer magnet carrier 503 includes grooves underneath the permanent magnets 311 to reduce eddy current losses. In this way, the hollow outer magnet carrier 503 may be manufactured as a single-piece component, rather than necessitating a segmented design.

The rotor further comprises an inner component 504 (FIG. 8B) which in this embodiment is press fit into the outer magnet carrier 503 into which a driveshaft 505 is engaged by splines (not shown).

As will be described further with reference to FIG. 7, in the present example the motor-generator 112 incorporates various features to facilitate passage of coolant through the machine to effect removal of heat. A fluid inlet 506 is provided at the non-drive end of the rotor 301, and a fluid outlet 507 is provided at a base of the motor-generator 112. Referring to FIG. 5, in a specific embodiment, the coolant is an oil, which may thereby also be used for lubrication of the rotor bearings 501 and 502.

FIG. 6

A magnified view of four slots of the stator 302 is shown in FIG. 5. As described previously, the yoke 401 has a plurality of teeth defined thereon. In the present example, teeth are divided into a set of wound teeth 601 carrying coils, for example coil 303, and a set of unwound teeth 602.

In the present embodiment, the width of wound teeth 601 is greater than the width of unwound teeth 602. This increases the degree of flux-linkage, as the coil-pitch tends to the same value as the pole-pitch. In a specific embodiment, the width of wound teeth is twice the width of unwound teeth.

Furthermore, in the present embodiment, the width of each tooth at its root $W_R$ in a circumferential sense is greater than or equal to its width at the tip $W_T$. The teeth therefore adopt a trapezoidal circumferential profile. It has been found that this leads to an advantageous reduction in torque ripple. Further, the trapezoidal circumferential profile maintains a constant flux density along each tooth's radial extent, which prevents localised saturation that may limit performance under high load.

In the present embodiment, the geometric configuration of the teeth 601 and 602 is such that the slots are substantially trapezoidal in cross section.

In the present embodiment, the stator slot ratio, which is the ratio of the stator slot inside diameter a to the stator slot outer diameter $\emptyset$o, is from 0.6 to 0.7. It has been found that adopting values in this range optimises the output torque for a given overall machine diameter. In a specific embodiment, the stator slot ratio is from 0.62 to 0.66. In a more specific embodiment, the stator slot ratio is 0.64.

As shown in the Figure, the coils such as coil 303 are formed from a plurality of turns of insulated conductor. In the present embodiment, the conductor is a transposed conductor. Transposed conductors are multi-strand conductors in which each strand is insulated, and is transposed in order to occupy each possible position along a specific length. The transposition of the strands may be continuous, discrete, or random. In this way, when the conductor is exposed to a magnetic field, each strand will on average link with the same number of flux lines as every other strand, thus dividing current equally among the strands. The strands are of small enough diameter that little skin effect can occur, thereby reducing losses due to induced eddy currents caused by the rotating rotor field.

In a specific embodiment, the transposed conductor is a litz conductor. Litz conductors are a particular type of transposed conductor in which strands of round cross-section are transposed continuously along the cable length. It will be appreciated however that other transposed conductors may be used instead, such as Roebel conductors which use rectangular strands transposed at discrete intervals.

In the present embodiment, the coils are configured to provide a slot fill-factor greater than zero and less than unity.

In a specific embodiment, the slot fill-factor is from 0.22 to 0.28. In a more specific embodiment, the slot fill-factor is 0.26. In this way, when mounted on a wound tooth 601, a void 603 is formed in each slot adjacent the unwound tooth 602.

In the present example, the coils are formed into substantially parallelogram-shaped cross section. Thus, in the present example, the voids 603 are triangular in cross-section, with their size being determined by the tooth size and the coil size.

As will be described further with reference to FIGS. 7A and 7B, the voids 603 the voids formed in the slots may act as axial cooling channels for a flow of coolant therethrough to impingement cool the coils 303 to 310.

FIGS. 7, 8A, 8B & 8C

As described previously, in the present embodiment the motor-generator 112 comprises a coolant to facilitate cooling of the rotor and the stator. A diagram of the flow of coolant through the motor-generator 112 is shown in FIG. 7.

Coolant, which as described previously may be an oil, but could instead be another suitable cooling fluid such as glycol etc., enters via inlet 506. The fluid inlet 506 leads to a radial impeller 701 mounted to the inner component 504 at the non-drive end of the motor-generator 112.

Figure 8C:
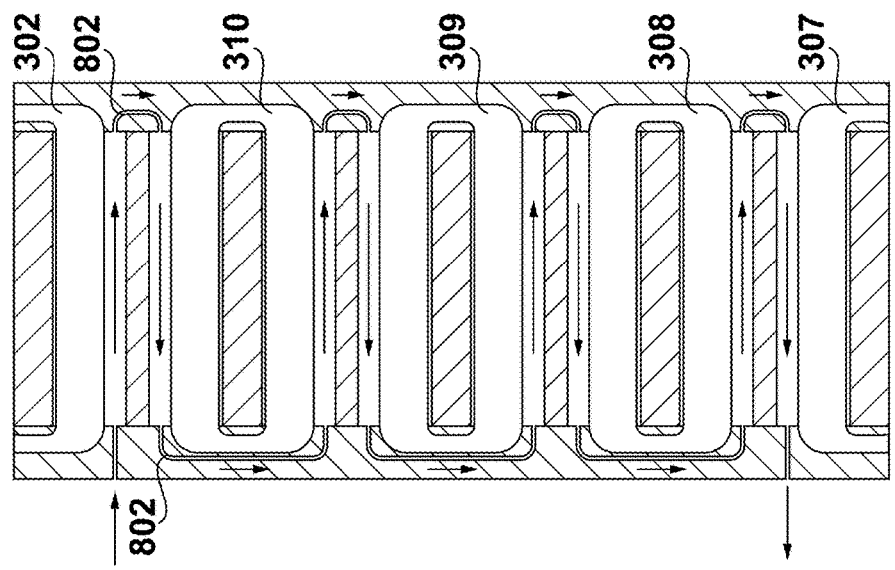
FIG. 8C is a developed plan view of the stator cooling path at the arcuate section of FIG. 4.
Figure 8A:
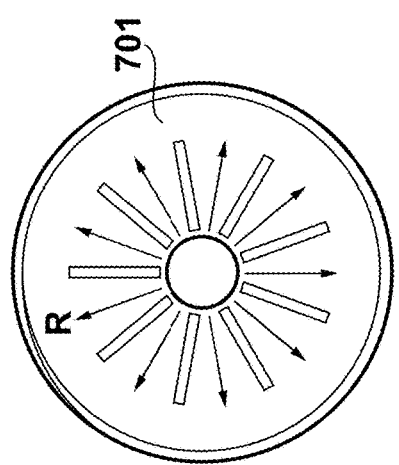
FIG. 8A is an end-on view of the inner rotor component of the rotor of the motor-generator.

Referring now to FIG. 8A, which is an end-on view of the radial impeller 701, rotation of the rotor 501 and the impeller 701 thereby results in the coolant being diverted radially in the direction of arrows R. This is accompanied by a centrifugal pressure rise.

Figure 7:
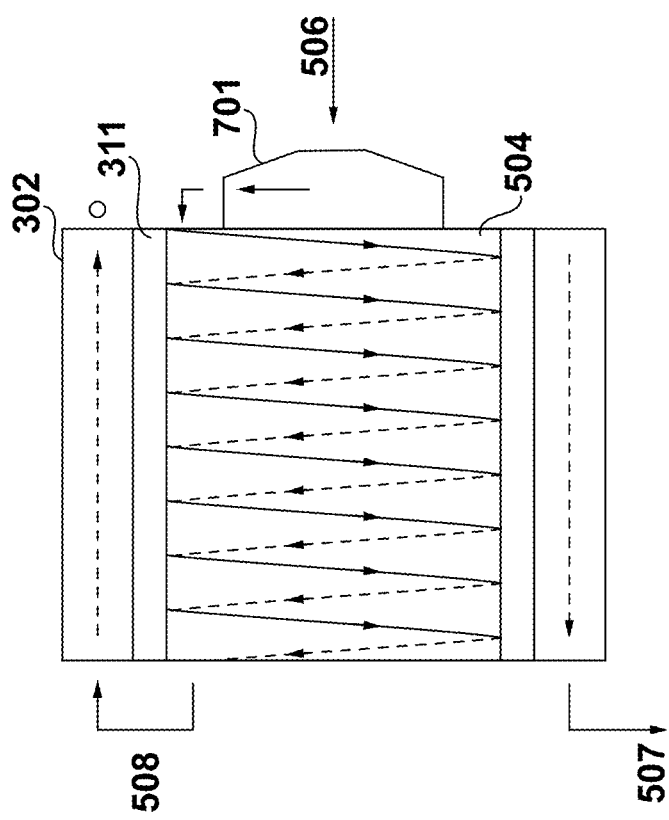
FIG. 7 is a schematic of coolant flow in the motor-generator.

Referring briefly to FIG. 5, it will be seen that coolant in the radial impeller 701 is contained by the outer magnet carrier 503, and thus is, as shown in FIG. 7, forced into a helical path.

Figure 8B:
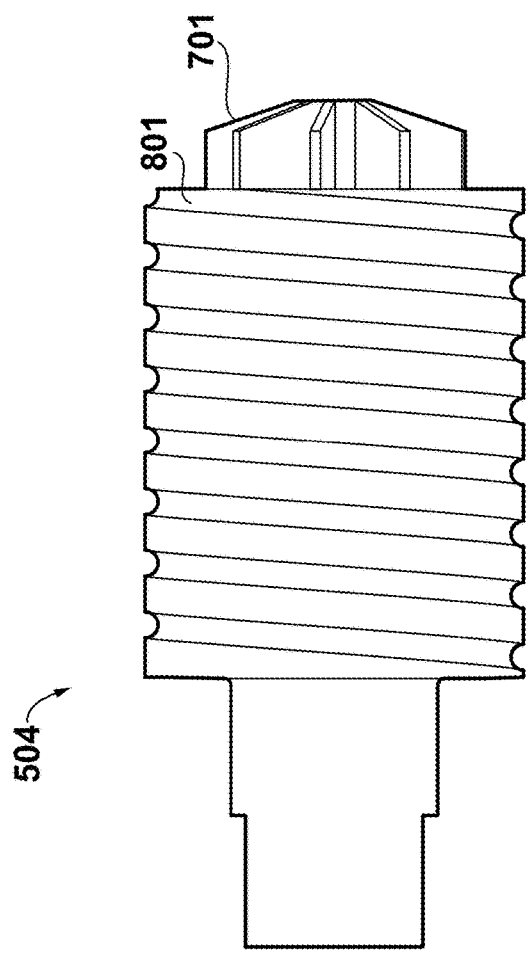
FIG. 8B is a side view of the inner rotor component of the rotor of the motor-generator.

A side view of the inner component 504 is shown in FIG. 8B, and illustrates a helical channel 801 formed thereon. The helical channel 801, together with the inner surface of the outer magnet carrier 503, form a helical fluid conduit underneath the permanent magnets 311. In operation, the helical fluid conduit acts as an Archimedes screw to draw coolant along the underside of the magnets 311 to remove heat therefrom.

After travelling through the helical fluid conduit to the drive end of the motor-generator 112, the coolant then emerges in a collector (508, FIG. 5) and is diverted to travel through the axial fluid channels in the stator slots.

The path the coolant takes in the present embodiment is shown in FIG. 8C, which is a developed plan view of the circumferential section III-III of FIG. 4. As shown in the Figure, the coolant follows a serpentine path through the axial fluid channels in the stator slots, facilitated by interconnecting ducts 802. A similar configuration is employed for the other 180 degrees of the stator. Eventually after passing through the axial fluid channels in the stator slots, the coolant exits the motor-generator 112 via the fluid output 507.

In an alternative embodiment, the coolant may alternatively be delivered from the helical fluid conduit into a first manifold at the drive end of the motor-generator 112, whereupon it may be delivered in parallel to, for example, all of the axial fluid channels. A second manifold may then be arranged to collect the coolant at the non-drive end of the motor-generator 112 and deliver it to a fluid outlet at the same end. It will be appreciated that alternatively a first manifold at the drive end may be arranged to pass coolant through a portion of the axial fluid channels, with a ducts returning the coolant through the remaining axial fluid channels to a second manifold at the drive end for consolidation and output via the fluid outlet 507. Indeed, it is envisaged that a combination of such or other approaches could be adopted.

It is envisaged that the motor-generator 112 may use the same oil system as the rest of the engine 101, and thus the coolant would be aircraft engine oil. It should be noted that a significant advantage of the coolant circuit described with reference to FIG. 7 is that there is no flooding of the airgap between the rotor 301 and the stator 302 which significantly reduces oil heating and oil churn.

FIGS. 9A & 9B

In the present embodiment, the teeth 601 and 602 on the yoke 401 are of straight-tooth configuration, nominally providing open slots. In this way, the coils 303 to 310 may be formed off-iron prior to placing them on the yoke 401. Alternatively, the coils 303 to 310 may be wound on-iron, and as will be appreciated by those skilled in the art, the process of doing so is less complex due to the open slots.

An approach for sealing the voids 603 to prevent leakage of coolant is therefore shown in FIGS. 9A and 9B. In the present embodiment sealing members 901 are provided to seal the voids 603. The sealing members 901 are engaged with the tips of adjacent teeth to circumferentially and axially seal the voids 603.

In normal electric machine designs, it is optimal to reduce the leakage flux as this does not contribute to developing torque. However, as previously described, for fault tolerance it is desirable to achieve a per-unit inductance close to unity. An open slot design is not normally conducive to this requirement, as tooth-tip leakage is typically a large component of the total leakage flux in permanent magnet electrical machines.

Thus, the sealing members 901 are comprised of a magnetic material to provide a flux path between the tooth tips to increase the leakage flux. It will be appreciated that the radial thickness and the magnetic permeability of the sealing members 901 may be selected to achieve the required leakage flux and thus obtain the desired inductance. In the present embodiment, the sealing members are formed of a soft magnetic composite (SMC) material consisting of a glass fibre epoxy having iron powder distributed therethrough. It is contemplated though that alternative materials with a distributed air gap (i.e. magnetic material particles in a filler) such as molybdenum permalloy powder or similar may be used.

The leakage flux may be controlled through variation of the permeability of the sealing members 901. In this way, the per-unit inductance, and therefore short-circuit current characteristics may be controlled by appropriate selection of the sealing members' material magnetic properties.

In an embodiment, the saturation flux density of the sealing members 901 is different to that of the rest of the stator yoke 401. In this way the electric machine's characteristics differ during the motor mode of operation compared to the generating mode of operation. In particular, in the motor mode of operation it is possible to saturate the sealing members 901 which in turn reduces the overall inductance of each coil. This in turn causes the power factor to change, reducing the drive voltage to achieve the same current at a given frequency. During the generating mode of operation, however, the only flux is that produced by the magnets 311 and thus the saturation of the sealing members and attendant reduction in inductance does not occur.

A further advantage of the use of the sealing members 901 in effectively forming closed slots is that the rotor 301 is shielded from any stray electric fields that may exist during switching of the coils 303 to 310 by the phase drive circuits 201 to 204. In operation, stray fields cause charge to be built up on the rotor, especially with higher switching speeds and the higher the power output. This built-up charge could otherwise, unchecked, subsequently discharge through the oil film of the bearings 501 and 502 causing electrical erosion and reducing bearing life.

As shown in FIG. 9A, the tooth tips of both the wound teeth 601 and the unwound teeth 602 comprise axial grooves 902. Referring now to FIG. 9B, which is an isometric view of a sealing member 901, corresponding axial ribs 903 are provided on each side for cooperation with the axial grooves 902 so as to retain the sealing members in position.

In order therefore assemble the present embodiment of the motor-generator 112, it is possible to follow the following process. After obtaining the yoke 401, the coils 303 to 310 are placed thereon. As described previously, they may either be formed off-iron, and simply placed onto the wound teeth 601, or alternatively they may be wound directly on the wound teeth 601 using known techniques such as hairpin winding or similar. Sealing members 901 are then engaged with the teeth 601 and 602 on the yoke 401. In the present embodiment in which the teeth feature axial grooves 902 and the sealing members 901 feature axial ribs 903, this may be achieved by sliding the sealing members axially into engagement.

In an embodiment, the process may further comprise a performing a vacuum pressure impregnation (VPI) procedure to seal the sealing members 901 to the yoke 401. As will be appreciated by those skilled in the art, this involves applying a varnish or a resin to the inner surface of the stator 302 following engagement of the sealing members 901 with the teeth 601 and 602, after which the assembly is rotated whilst subjected to a vacuum followed by a high pressure atmosphere. This fills any gaps in the assembly, and removes the need for a stator sleeve to prevent leakage of coolant into the airgap.

It will be appreciated that the cooling configuration and use of sealing members may be applied to electric machines with different numbers of teeth and coils, for example to electric machines with four or more teeth and alternate wound stators, i.e. n/2 coils.

FIG. 10

As described previously with reference to FIG. 2, the controller 205 controls the operation of both the phase drives 201 to 204 and the state of the contactors 208 to 215. In this way, the electric drive system may respond to both faults in the motor-generator 112 and on the first dc bus 206 and the second dc bus 207.

Figure 10:
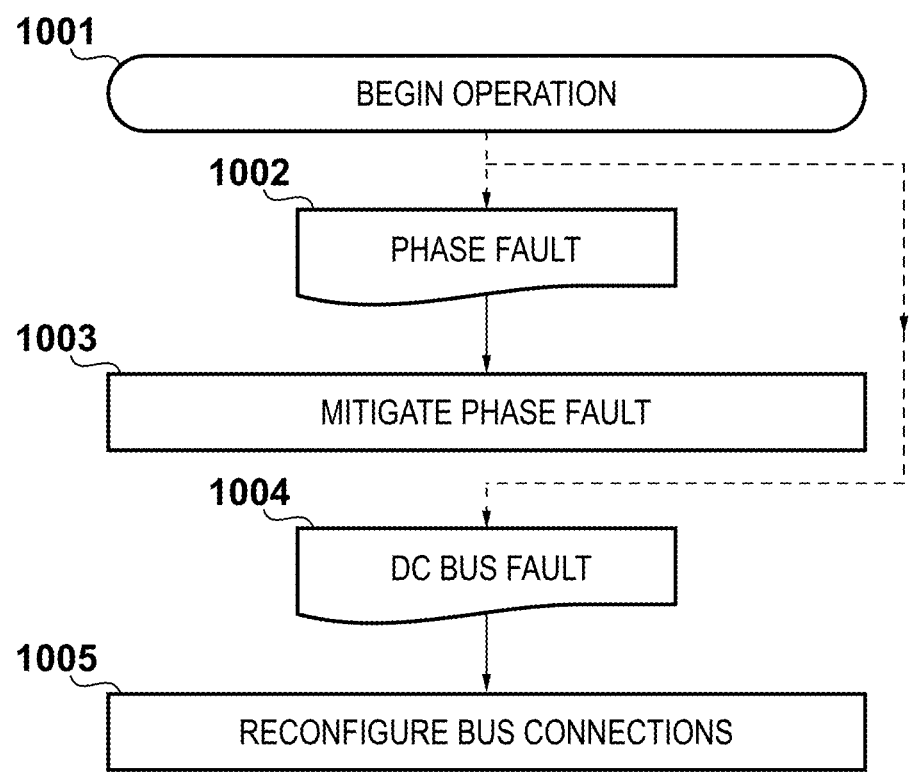
FIG. 10 shows steps carried out by the controller of the electric drive system of FIG. 2.

Steps carried out by the controller 205 in operation are set out in FIG. 10. At step 1001, the controller 205 begins standard non-faulted operation which in the present embodiment is under direction from the EEC 113, i.e. either operating as a motor to initiate start of the engine 101 or otherwise add torque, or operating as a generator to supply the first dc bus 206 and the second dc bus 207.

After some time, one of two types of fault may occur. In some circumstances, a phase fault 1002 may occur, due to an issue with one or more of the phase drives 201 to 204, one of the phases in the motor-generator 112 itself, or possibly with the conductors between a phase drive and the motor-generator.

Such faults may be sensed on the basis of a measurement of any of current flow or voltage of each phase. For example, the fault may be sensed using one or more of overcurrent protection, ground (earth) fault protection, unit (or differential) protection and negative phase sequence protection. The fault may be sensed by one or more of a current transformer and a voltage transformer or digital equivalents.

In response to the identification of such a fault and as such the loss of operation of one of the phases, the controller 205 proceeds to step 1003 in which the phase fault is mitigated. Procedures carried out during step 1003 will be described with reference to FIG. 11.

Alternatively, a bus fault 1004 occurs on one of the first dc bus 206 and the second dc bus 207. In response to this, the controller 205 invokes procedures to reconfigure connections to the dc busses at step 1005. Procedures carried out during step 1003 will be described with reference to FIG. 11.

The functionality in the controller 205 thereby allows the electric drive system to continue operation in the presence of a single fault on the ac side of the phase drive circuits 201 to 204, and a single fault on the dc side of the phase drive circuits 201 to 204. Even when having entered a faulted mode of operation, the configuration of the motor-generator 112 is such that a further fault does not lead to a hazardous or catastrophic event. This is due to the modular phase windings guaranteeing adequate independence of the phases. This is particularly advantageous when the systems described herein are applied in an aerospace environment, in the that an aircraft may be dispatched with a single fault in the electric drive system, which allows sufficient time for repairs to be organised and the aircraft to return to a service location.

FIG. 11

Figure 11:
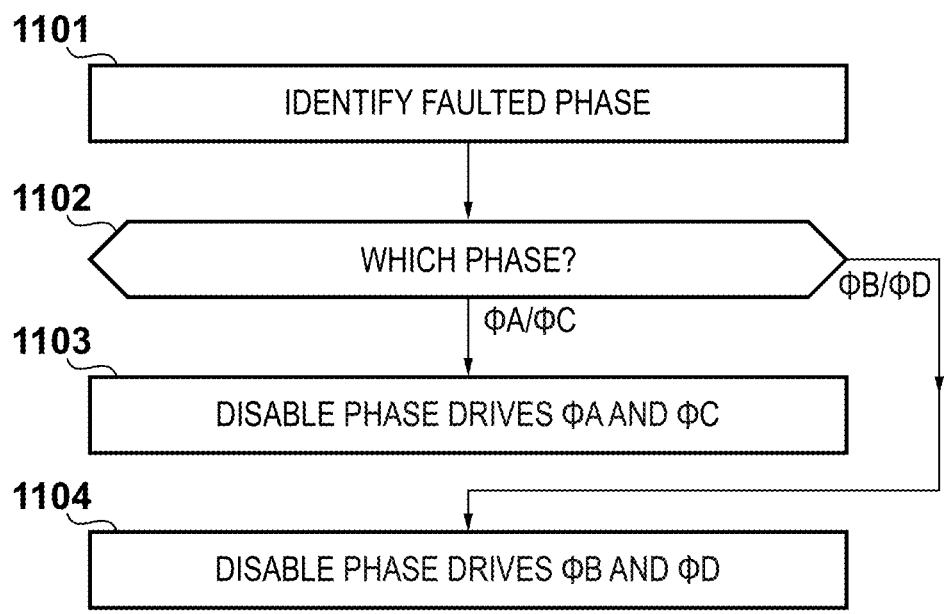
FIG. 11 shows steps carried out by the controller to respond to a phase fault.

Procedures carried out during step 1003 when operating in a motor mode of operation are set out in FIG. 11.

Following occurrence of a phase fault 1002, at step 1101 the faulted phase is identified. At step 1102 a question is asked as to which phase has experienced a fault.

If the faulted phase is either phase ΦA or ΦC, then control proceeds to step 1103 in which both of the corresponding phase drive circuits are disabled. In the present embodiment this would be phase drives 201 and 203. It will therefore be appreciated why in the present embodiment it is particularly advantageous to employ the duplex winding scheme described previously with reference to FIG. 3, as in this fault condition it is possible to retain mechanical balance when still only operating with phases ΦB or ΦD.

If instead the faulted phase is either phase ΦB or ΦD, then control proceeds from step 1102 to step 1104 in which both of these phase drive circuits are disabled. In the present embodiment this would be phase drives 202 and 204.

Similar procedures may be performed in a generator mode of operation in response to a phase fault. Following these procedures, then in an embodiment the remaining operational phases are connected with both dc busses to maintain supply thereto.

FIG. 12

Figure 12:
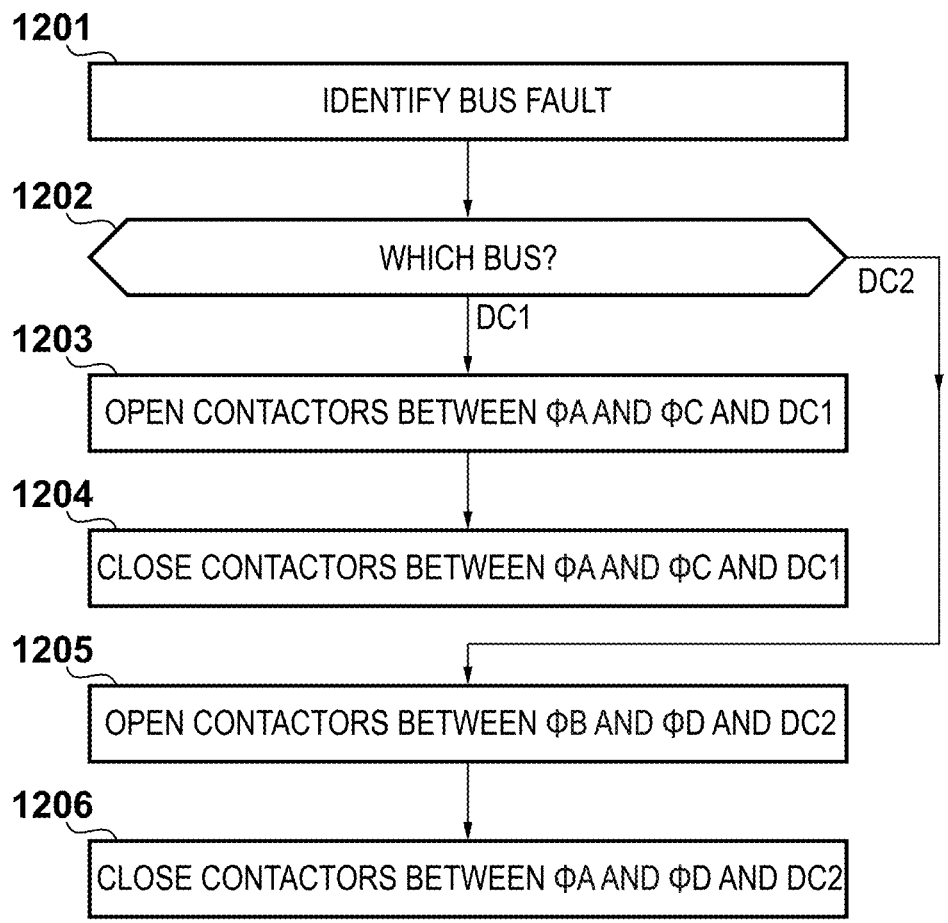
FIG. 12 shows steps carried out by the controller to respond to a bus fault.

Procedures carried out during step 1005 are set out in FIG. 12. Following occurrence of a bus fault 1004, at step 1201 the faulted bus is identified. At step 1202 a question is asked as to which bus has experienced a fault.

If the faulted bus is first dc bus 206, then control proceeds to step 1203 in which the controller 205 opens the contactors 208 and 212 (corresponding to phase ΦA and phase ΦC respectively) and the first dc bus 206. At step 1204, the controller 205 closes the contactors 209 and 213 (corresponding to phase ΦA and phase ΦC respectively) and the second dc bus 206. This reconfiguration therefore supplies the second dc bus 206 from all of phases ΦA, ΦB, ΦC, and ΦD.

If the faulted bus is second dc bus 207, then instead control proceeds from step 1202 to step 1205 in which the controller 205 opens the contactors 211 and 215 (corresponding to phase ΦB and phase ΦD respectively) and the second dc bus 207. At step 1204, the controller 205 closes the contactors 210 and 212 (corresponding to phase ΦB and phase ΦD respectively) and the first dc bus 205. This reconfiguration therefore supplies the first dc bus 205 from all of phases ΦA, ΦB, ΦC, and ΦD.

At some future point in time, the dc bus fault may clear, in which case controller 205 may reverse the operations described above to reconfigure the electric drive system back to its normal mode of operation.

It should be noted that whilst the present embodiments have been described with reference to a turbofan engine 101 for an aircraft, it will be understood that the principles of the described electrical system and electric machine may be applied to other installations, for example in a marine environment such as on a naval vessel powered by gas turbines, or in an energy production environment such as in a power station utilising natural gas fired gas turbines, or any other suitable application.

Furthermore, it is contemplated that the electrical system and electric machine configurations described herein may be extended to facilitate connection of rotary electric machines with other types of rotating machinery. For example, the rotary electric machines may be connected with other types of heat engines, for example internal combustion engines such as reciprocating or Wankel-type engines. Other types of heat engines such as steam turbines operating according to the Rankine cycle may be connected.

Various examples have been described, each of which comprise various combinations of features. It will be appreciated by those skilled in the art that, except where clearly mutually exclusive, any of the features may be employed separately or in combination with any other features and the invention extends to and includes all combinations and sub-combinations of one or more features described herein.

The invention claimed is:

1. A fault-tolerant four-phase electric drive system, comprising:
a rotary electric machine having a permanent magnet rotor and an alternate-wound stator having eight evenly-spaced coils arranged in pairs, each coil in each pair being separated by 180 degrees;
a first phase (ΦA) comprising a first one of the coil pairs and a first phase drive circuit connected therewith;
a second phase (ΦB) separated by +45 degrees from the first phase and comprising a second one of the coil pairs and a second phase drive circuit connected therewith;
a third phase (ΦC) separated by +90 degrees from the first phase and comprising a third one of the coil pairs and a third phase drive circuit connected therewith;

a fourth phase (ΦD) separated by +135 degrees from the first phase and comprising a fourth one of the coil pairs and a fourth phase drive circuit connected therewith; and a controller connected with the first, second, third and fourth phase drive circuits to control operation thereof, wherein the first phase drive circuit and third phase drive circuit are connected with a first dc bus; and the second phase drive circuit and the fourth phase drive circuit are connected with a second dc bus, and wherein the stator has sixteen slots, each of which is defined by a wound tooth carrying a coil, and an unwound tooth not carrying a coil, and wherein the width of wound teeth is greater than the width of unwound teeth.

2. The electric drive system of claim 1, wherein, in a motor mode of operation:

in response to loss of operation of one of the first phase and the third phase, the phase drive controller is configured to cease operation of both the first phase and the third phase;

in response to loss of operation of one of the second phase and the fourth phase, the phase drive controller is configured to cease operation of both the second phase and the fourth phase.

3. The electric drive system of claim 1, wherein:

the first phase drive circuit, second phase drive circuit, third phase drive circuit, and fourth phase drive circuit are connected with the first dc bus via respective electrical contactors operable by the controller;

the first phase drive circuit, second phase drive circuit, third phase drive circuit, and fourth phase drive circuit are connected with the second dc bus via respective electrical contactors operable by the controller.

4. The electric drive system of claim 3, wherein, in a non-faulted mode of operation, the controller is configured to:

close contactors between the first phase drive circuit and the first dc bus, the second phase drive circuit and the second dc bus, the third phase drive circuit and the first dc bus, and the fourth phase drive circuit and the second dc bus;

open contactors between the first phase drive circuit and the second dc bus, the second phase drive circuit and the first dc bus, the third phase drive circuit and the second dc bus, and the fourth phase drive circuit and the first dc bus.

5. The electric drive system of claim 3, wherein, in response to a fault on the first dc bus, the controller is configured to:

close contactors between the second dc bus and the first phase drive circuit, second phase drive circuit, third phase drive circuit, and fourth phase drive circuit;

open contactors between the first dc bus and the first phase drive circuit, second phase drive circuit, third phase drive circuit, and fourth phase drive circuit.

6. The electric drive system of claim 3, wherein, in response to a fault on the second dc bus, the controller is configured to:

close contactors between the first dc bus and the first phase drive circuit, second phase drive circuit, third phase drive circuit, and fourth phase drive circuit;

open contactors between the second dc bus and the first phase drive circuit, second phase drive circuit, third phase drive circuit, and fourth phase drive circuit.

7. The electric drive system of claim 1, wherein the width of wound teeth is twice the width of unwound teeth.

8. The electric drive system of claim 1, wherein the slots are substantially trapezoidal in cross section.

9. A gas turbine engine comprising the electric drive system of claim 1.

* * * * *